United States Patent Office 3,273,398
Patented Sept. 20, 1966

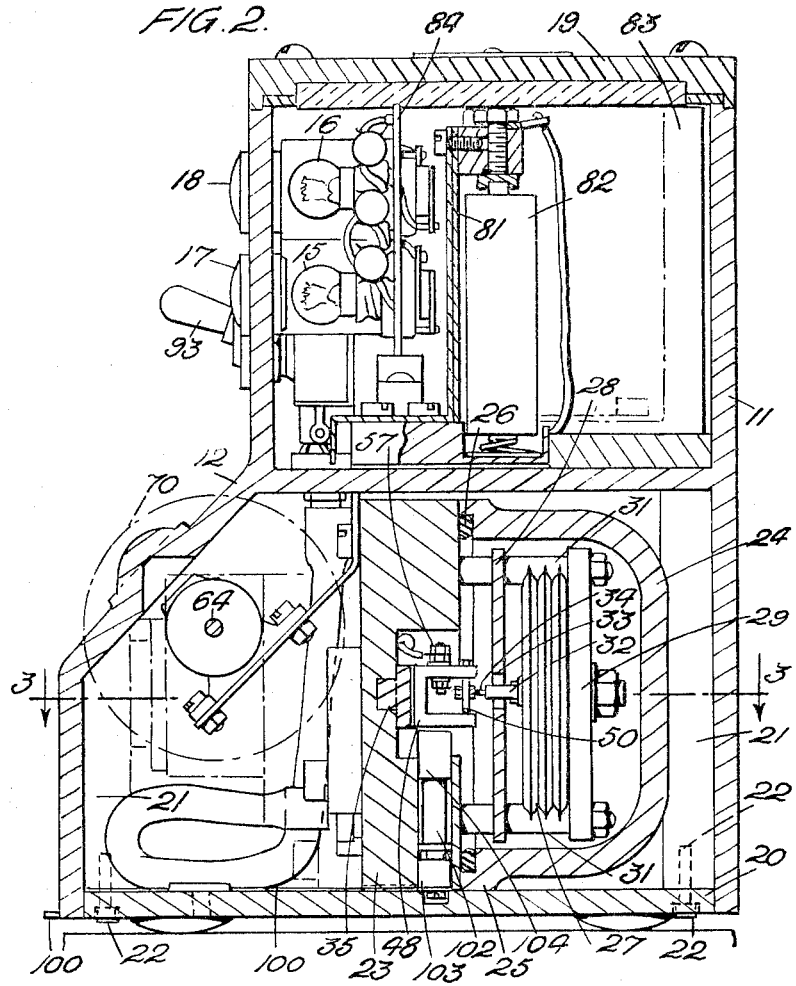

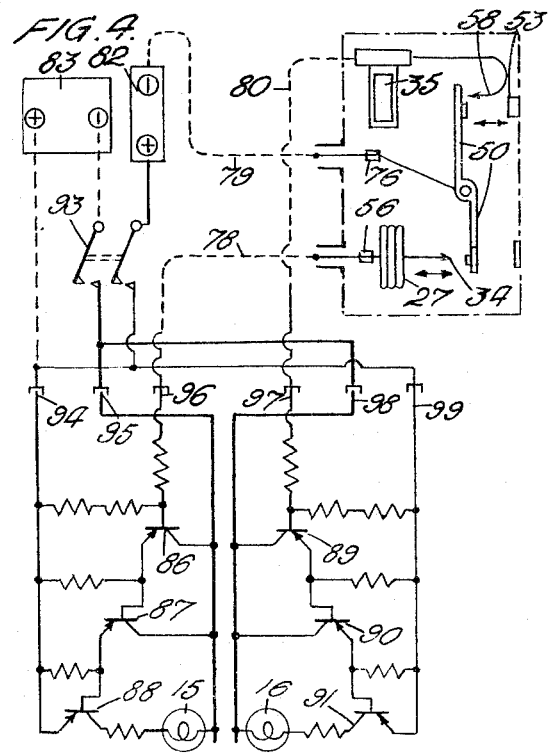
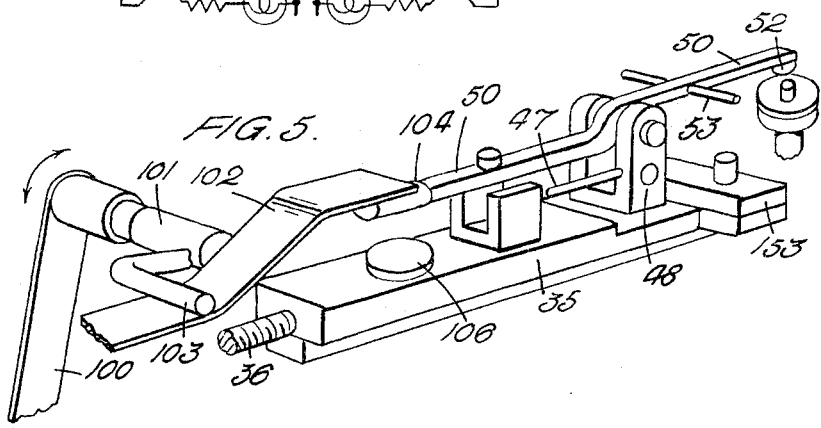

3,273,398
ANEROID BAROMETERS
Douglas Cecil William Thomas Sharp, Basingstoke, England, assignor to Appleby & Ireland Limited, Hampshire, England, a British company
Filed Aug. 26, 1963, Ser. No. 304,461
Claims priority, application Great Britain, Nov. 6, 1962, 41,974/62
9 Claims. (Cl. 73—386)

This invention comprises improvements in or relating to aneroid barometers and it is an object of the invention to provide an aneroid barometer of high accuracy.

According to the present invention an aneroid barometer comprises in combination a capsule assembly, a contact member moved by the assembly, a first lever member, an electrical circuit containing an indicator (for example a lamp) to indicate when contact exists, a second lever arm operatively connected to the first and carrying a third contact, a feeler-contact mounted so as to be movable toward said third contact in a direction such that movement of the feeler-contact beyond the point where it engages the third contact will break contact between the first and second contacts, a second electrical circuit to indicate when contact between third and fourth contacts is made, a hand-actuating member to move the feeler-contact and measuring means for showing the extent of movement of the hand-actuating means. Owing to the provision of the two circuits, when contact is made between the first two contacts one indication is given; when contact is made between the feeler-contact and the third contact a different indication is given; and there is a point where both circuits are operative and give indications. This permits the dilation or contraction of the capsule assembly to be determined with great accuracy without imposing any constraint on the capsule, and therefore with much greater accuracy than by the usual clockwork gearing to a pointer. Indeed, with the mechanism as hereinafter described, an accuracy of $\frac{1}{10}$ of a millibar can be consistently maintained.

Preferably the hand-actuating-member is rotatable and the measuring means for showing its position is a device (for example a revolution counter) for showing the extent of its rotation. The reduction mechanism may comprise a micrometer screw and nut and the hand-actuating-member on the one hand and feeler-contact on the other be connected to the screw and the nut, or vice versa. The reduction mechanism may further comprise a worm-reduction gear to increase the velocity ratio.

Preferably the electrical means for indicating when contact is established comprises an amplifier circuit and a signal light operated by said circuit upon make or break of the electrical connection between the contact member and the feeler-contact.

In one construction the contact member comprises a beam pivoted to one side of the centre line of the capsule assembly and urged toward a contact on a moving part of the capsule assembly by a yielding control such as a light spring or a magnet, the feeler-contact engages said beam in such a direction as to urge the contact member out of contact with the capsule assembly and the amplifier circuit includes means to operate two signal lights, one when the feeler-contact engages the beam and the other when contact of the beam with the contact on the capsule assembly exists.

The use of an amplifier circuit to operate a signal light greatly reduces the current at the contacts. This current need not exceed, for example, 20 micro-amperes, with the result that sparking and deterioration of the contacts can be eliminated. Preferably the circuit is such that contact of the beam with the capsule assembly illuminates one signal light and contact of the feeler-contact with the beam illuminates the other signal light. This means that at the moment when perfect adjustment is attained both signal lights will be illuminated and that at other moments one light or the other will be illuminated so that the direction in which movement of the hand-actuating-member must take place in order to take a reading is shown by which ever signal light is illuminated. A press-button or biased switch can be added so that the circuit is cut out at times when no reading is required to be taken.

According to a further important feature of the invention, the capsule assembly and its contacts may be enclosed in a sealed casing fitted with a damping plug to minimise variations due to momentary variations in altitude of the barometer, as by pitching of a ship which carries it. It will be appreciated that with an apparatus which can read to $\frac{1}{10}$ of a millibar a movement up or down of as little as three or four feet will suffice to change over from the illumination of one signal lamp to that of the other and as the pitching of a vessel at sea may easily move the apparatus up or down by a much larger amount than this, it would be impossible without the damping plug to get a definite reading of the barometric pressure.

The following is a description, by way of example, of one construction in accordance with the invention:

In the accompanying drawings,

FIGURE 2 is a section upon the line 2—2 of FIGURE 1, looking in the direction of the arrows 2 in FIGURE 1;

FIGURE 4 is an electrical connection diagram; and

FIGURE 5 is a detail.

Figure 1:
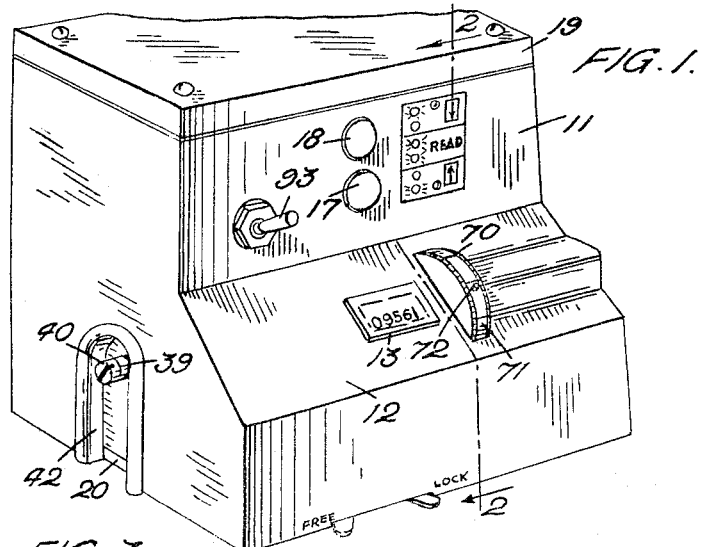
FIGURE 1 is a general perspective view of the barometer.

The apparatus comprises a casing 11, cast in a light alloy, which is of generally rectangular form but which is widened at one side in its bottom half so as to provide a frontal extension with a sloping upper wall 12. By virtue of this construction, the window 13, behind which is the indicating device, displaying millibars and $\frac{1}{10}$'s of millibars digitally, is at 45° to the horizontal, so allowing the instrument to be clearly read either when standing on a desk or when affixed to a vertical partition. The upper part of the casing 11, which is joined to the lower part by the sloping wall 12, is internally separated therefrom by a horizontal partition 14 (FIGURE 2) cast integrally with it. The lower part of the casing below the partition 14 contains the barometer proper and the upper part constitutes a compartment for a battery to operate the signals and to receive an amplifier circuit and two signal lamps 15, 16. The signal lamps are arranged one above another about the middle of the casing and can be seen through windows 17, 18 in the front. This part of the casing is covered with an easily removable sealed lid 19 so that the battery and the lamps can be readily renewed when necessary. The bottom 20 of the lower part of the casing is removable and has mounted upon it the aneroid parts. It fits under internal ribs 21 at the corners of the casing 11, to which it is secured by screws 22.

Secured to the removable bottom 20 of the casing parallel with and approximately halfway between the front and the back is a thick upright brass plate 23 which forms the main frame. On the back of this plate there is secured an airtight dust-cover 24 with a flange 25 around its edges where they abut upon the plate, which flange is sealed by a gasket 26 to the plate itself. The dust-cover therefore forms an airtight enclosure and the barometer capsule stack 27 is located within it. The capsule stack is carried between two plates 28, 29 which form a sub-frame and which are separated from each other and supported from the main frame by pillars 31. These subframe plates 28, 29 are parallel with the main frame and the capsule assembly 27 consists of a number of aneroid capsules, say three, in series with one another one of which is attached to the outer sub-frame plate 29. The other end capsule of the assembly carries a bimetallic strip 32 which is located in an aperture 33 in the inner plate 28 of the sub-frame and between the sub-frame and the main frame it carries an iridium/platinum contact 34. It is the position of this contact 34 which has to be determined by the measuring mechanism.

The main frame plate 23 is machined out to afford guides for a slide 35 which extends between the main frame plate 23 and the contact 34 of the aneroid capsule on the sub-frame. The position of this slide 35 is adjustable by a short lead screw 36 which is threaded into it at one end and is held from longitudinal movement by a bearing in a web 37 on the main frame plate 23. The end of the lead screw terminates in a head 38 which contains a hexagon aperture or a cross cut to enable it to be adjusted and in line with this head there is secured in the frame plate a short tubular member 39, the end of which can receive a screwed damping plung 40. The damping plug is drilled through and contains a block of porous metal 41 which permits the passage of air gradually. This damping plug is in line with and projects through a slot 42 in the side of the outer casing which contains the apparatus and it can be removed for cleaning and replaced. When removed, access can be had to the screw 38 for adjusting the slide 35 but this adjustment is not normally required after the apparatus has once been calibrated. The slide 35 is held firm in its guides in the plate 23 by a screw 43 passing through a slot 44 in the plate. This screw is covered by a sealed cover 45.

At the other end from the lead screw which moves it, the slide 35 carries on a metal block 46 a beryllium copper rod 47 which extends from it in a direction parallel to its sliding movement. On the end of the rod 47 is a pivot block or cock 48 on which is mounted a beam-assembly, shown in the detail, FIGURE 5. The block 48 has two ears which extend horizontally toward the capsules and have pivoted between them on a vertical axis a hub for a contact beam 50 on which is a magnet armature 53. The pivots are preferably jewelled and the contact beam extends in both directions and carries at its ends contacts 51, 52 made of 10% iridium/platinum alloy. Electrical contact is made to the beam by a fine wire secured to the beam at one end and to an insulated lead through terminal 76 (FIGURE 4). The beam 50 extends horizontally in a direction more or less parallel with the movement of the slide 35 which carries it and the armature 53 is under the influence of a permanent magnet 153 which tends to urge it in such a direction that one end will always tend to move into contact with the platinum/iridium contact 34 which is carried by rod 32 on the aneroid capsule stack 27. The capsule assembly 27 is carried on an insulated stem 54 in the plate 29 and this is connected by wire 55 to a terminal 56 which leads to the electrical indicating circuit hereinafter described. The centre of the beam 50 is in electrical contact with the block 48 which carries it through a fine wire and the block 48 carries a terminal 57 also connected to the electrical circuit; the other end of the beam co-operates with a movable earthed feeler-contact 58. It will be seen that adjusting the lead screw 36 moves the slide 35 so that the distance of the pivot of the beam 50 from the point of contact of the beam with the contact 34 carried by the aneroid assembly 27 can be varied and thus the velocity-ratio of beam movement to capsule movement can be altered until it has been adjusted to agree with any idiosyncrasies of the capsule assembly.

The feeler-contact 58 just referred to is made of iridium/platinum and the stem 59 which carries the contact passes through an aperture in a bearing bush 60 in the main frame plate. It is therefore in electrical connection with the frame plate 23. This bush 60 is sealed to the main frame plate by a gasket 61 and contains an O-seal 62. The sealed bush 60 of the feeler-contact 58, the tube 39 which contains the damping plug 40 and the sealed screw 43 are the only means of access for air to the interior of the space enclosed between the main frame plate 23 and the flanged cover 25, so the whole of the capsule assembly is effectively supplied with atmospheric pressure only through the damping plug 40.

The bush 60 is enlarged where it projects from the frame plate 23 and in front of it there is secured a gear-box 63. The gear-box contains a worm-gear and a spindle 64 which carries the worm of the worm-gear which extends from the gear-box horizontally. The worm-wheel of the gear has a spindle 65 which enters a hollow extension 66 of the contact spindle 59. The extension 66 has externally a micrometer thread and the micrometer thread works in a nut 67. The spindle 65 is slidably keyed to the extension 66 and so rotates it. The micrometer nut 67 is split and provided with a cone adjuster 68 so that all slack between the screw and the nut can be taken up. Thus it will be seen that rotation of the worm spindle 64 will operate the micrometer screw and move the feeler-contact 58 towards or away from the contact beam member 50 which is supported within the aneroid casing.

The worm spindle 64 carries a finger-disc 70 and its location is such that the periphery of the disc 70 can project through a slot in the sloping shelf 12 of the outer case, just below the windows 17, 18. The disc can be operated by a touch of the finger to rotate it in either direction. It is made in two interfitting co-axial parts, one the part 70 which is mounted directly on the worm spindle and the other the part 71. The part 71 is connected to the spindle of a cyclometer-type counter mounted below the window 13 in the shelf 12 beside the finger disc so that its readings can be easily seen. Preferably the counter moves one figure for each tenth of a revolution of the control disc. The two parts 70, 71 of the finger disc are adjustable angularly relatively to each other for zeroising purposes. When the zero has been correctly adjusted they can be locked together so as to remain in the adjusted position. To this end the edges of the discs 70 and 71 are serrated and there is a locking screw 72 which locks the two discs together.

Flexible electric leads extend from the two contact terminals 56, 76 and from the brass main frame plate 23 through a bush 77 in the edge of the frame plate which carries the three connecting wires 78, 79, 80 through the partition in the outer casing. Leads 56 and 76 pass through metal/ceramic seals and are solder-sealed. These leads are intended never to be undone and can be sealed effectively by means of a plastic conduit therefore to prevent access of air to the interior of the flanged cover 24 around the capsules and to the compartment containing the battery and amplifier.

Within the upper part of the casing 11 there is a partition 81 parallel with the front and back of the casing and behind the partition are batteries 82, 83. In front of the partition there are grooved guides in the walls of the casing for the insertion of a flat insulating plate 84 which carries a printed transistor-amplifier circuit and also carries the bases of the two signal lamps 15, 16 above referred to. The printed circuit panel 84 can be slid in and out with its lamps as desired and the flexible wires which come from the contacts in the lower half of the casing are connected to a socket into which is plugged the printed circuit which may be completely removed when renewal of an electric lamp is called for.

Figure 3:
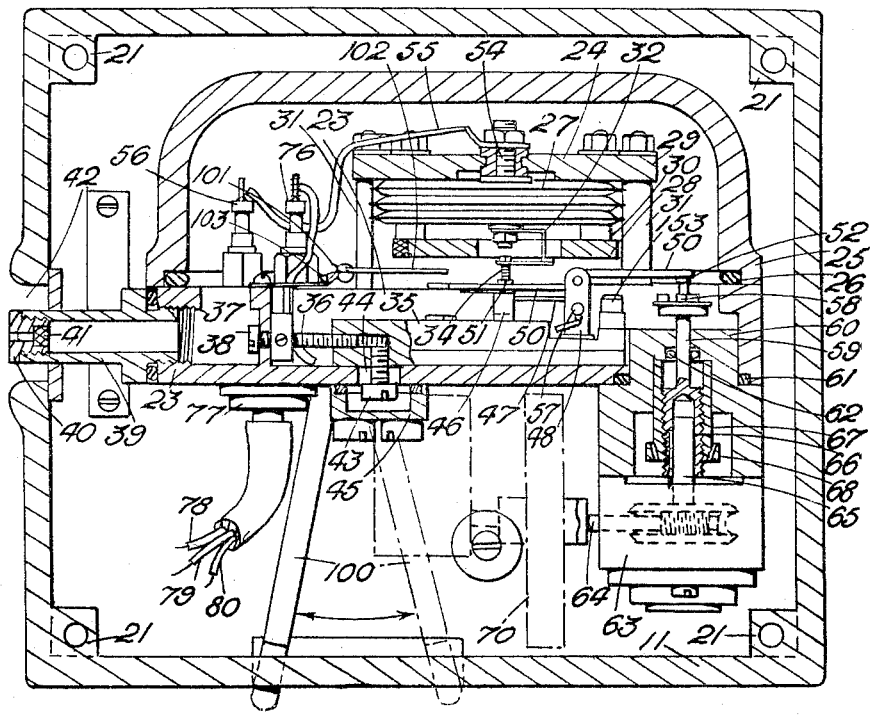
FIGURE 3 is a section upon the line 3—3 of FIGURE 2, looking in the direction of the arrows.

FIGURE 5 shows some of the parts of the mechanism to an enlarged scale, and particularly the device for locking the instrument by clamping the moving parts. In FIGURES 1 to 3 there can be seen a locking lever 100 in the base of the instrument, which is pivoted on a vertical spindle 101 below the member 48 which carries the bearings of the beam 50. The spindle 101 has a laterally projecting operating-arm 103 made of stout wire which engages a clamping spring 102 made of thin flat springy material. When lever 100 is moved into locking position as shown in FIGURE 1, the clamping spring 102 is urged into engagement with the contact beam 50. The clamping spring 102 has an insulated tip which engages the beam 50 and prevents it from moving when the locking lever 100 is in locked position. It will be noted that the end of the beam 50 is pushed into engagement with a rubber pad 106 which cushions the effect of any blow on the bearings of the beam. The result is that if the apparatus received a blow, as might happen in the event of, say, a forced landing of an aircraft on which it might be carried, damage would be prevented. The slide 35 carries a rubber pad 106 to cushion beam 50 as it moves toward the slide.

The electrical connections are shown in FIGURE 4, where the rectangle encloses the portion within the cover 34, and shows the terminals 56 and 76, with leads 78, 79, 80. There are two amplifier circuits, one connected to the capsule assembly contact 34 by line 78 and the other connected by line 80 to the feeler-contact 58 which engages the other end of the beam. The beam is connected to the battery 82 by line 79 and so is common to both circuits. They are energised by the battery and are of standard form with three transistors 86, 87, 88 for the one connected to contact 34 and three transistors 89, 90, 91 connected to contact 58 and they serve in the third stage to operate one or other of the signal lamps 15, 16 from battery 83. In addition, there is a push button or biased switch 93 projecting through the front of the outer casing which serves to connect or disconnect the battery from the amplifier circuits. The switch must be held when taking a reading and when released it cuts off the batteries and saves them from becoming quickly run-down.

The plug attached to the printed circuit on the plate 84 has six ways, indicated at 94, 95, 96, 97, 98 and 99, which enter sockets connected to the batteries and the remainder of the circuit as shown. Thus all the transistorised part of the circuit is on the plate 84 and in the event of a fault can be replaced immediately by a spare unit.

In use, all that is necessary is (with lever 100 in unlocked position) to press the switch 93, to note which signal lamp is alight, and to move the periphery of the finger disc 71 in the direction of the unlit lamp. When both lamps are alight the reading on the counter shows the atmospheric pressure to 1/10 of a millibar. In practice the upper lamp is made the last lamp to light as this removes any inherent hysteresis in the mechanism.

It will be noted that the aneroid capsules 27 have no work to do, in contrast with ordinary aneroids in which the capsules have to operate a multiplying mechanism. In the present instance, all the capsules have to do is to move the contact carried by the stem 54, which contact is quite free. The position of this contact is then determined by movements, the power for which is derived from the operator working the finger disc 71.

I claim:
1. An aneroid barometer comprising in combination a pressure-responsive capsule, a pivotally mounted lever, a movable member carried by said capsule to move in accordance with pressure changes, a first electrical contact on the lever, a co-operating adjustable electrical contact member, means for adjusting the position of said adjustable electrical contact member towards and away from said first electrical contact, means for indicating the position of adjustment of said adjustable electrical contact member, a second pair of co-operating electrical contacts on said lever and said movable member respectively, means urging said lever about its pivot in a direction to close said second pair of contacts, said lever being arranged so that movement of the lever due to the adjustable electrical contact bearing against said first electrical contact causes the said second pair of electrical contacts to open and electric circuit means including indicating means for indicating when both pairs of electrical contacts are closed.

2. An aneroid barometer as claimed in claim 1, wherein said indicating means comprise first and second indicator lamps, said circuit means being arranged to energize said first lamp when contact is made between said first electrical contact and said adjustable electric contact and to energize said second lamp when said second pair of electrical contacts are closed.

3. An aneroid barometer as claimed in claim 1, wherein the said means for adjusting the position of the adjustable contact member comprises a rotatable member and a reduction gear driven by said rotatable member and driving the adjustable contact member which rotatable member is presented to the operator edge-wise.

4. An aneroid barometer as claimed in claim 3, wherein there is provided a revolution counter driven by said rotatable member to give a digital pressure indication.

5. An aneroid barometer comprising in combination a capsule assembly, a first contact on a moving part of the capsule assembly, a contact member consisting of a beam pivoted to one side of the center line of the capsule assembly, a second contact on said contact member, means urging said beam about its pivot in a direction moving said second contact towards said first contact, a feeler-contact to engage said contact member, means for moving the feeler-contact, the feeler-contact engaging said beam in a direction such as to urge the contact member away from said first contact, electrical means for indicating when contact is established between said feeler-contact and said contact member and electrical means for indicating when contact between said first and second contacts exists, and measuring means for showing the position of said feeler-contact.

6. An aneroid barometer as claimed in claim 5, wherein said means for moving the feeler-contact comprises a hand-actuating member and a reduction mechanism between the hand-actuating member and the feeler-contact.

7. An aneroid capsule as claimed in claim 5, wherein said means urging said lever about its pivot comprises a magnet.

8. An aneroid capsule as claimed in claim 5, wherein said first electric circuit means includes an amplifier circuit and a signal light operated by said circuit upon make and break of the electrical connection between the contact member and the feeler-contact.

9. An aneroid capsule as claimed in claim 8, wherein said further electric circuit means includes a further amplifier circuit and a further signal light operated by said further circuit upon make and break of the electrical connection between said first contact and said contact member.

References Cited by the Examiner

UNITED STATES PATENTS 3,091,122  5/1963  Pike et al. _____ 73—386 X
3,112,649  12/1963  Pike et al. _____ 73—386 X

FOREIGN PATENTS 454,443  10/1936  Great Britain.

LOUIS R. PRINCE, *Primary Examiner.*

D. O. WOODIEL, *Assistant Examiner.*